(12) United States Patent
Beaudoin (10) Patent No.: US 10,073,423 B2
(45) Date of Patent: Sep. 11, 2018

(54) LOW VOLTAGE ENVIRONMENT CONTROLLER WITH POWER FACTOR CORRECTION FLYBACK POWER SUPPLY (71) Applicant: Distech Controls Inc., Brossard (CA)

(72) Inventor: Daniel Beaudoin, Chambly (CA)

(73) Assignee: Distech Controls Inc., Brossard (CA)

( * ) Notice: Subject to any disclaimer, the term of this patent is extended or adjusted under 35 U.S.C. 154(b) by 246 days.

(21) Appl. No.: 14/576,488

(22) Filed: Dec. 19, 2014

(65) Prior Publication Data

US 2016/0181813 A1   Jun. 23, 2016

(51) Int. Cl.
G05B 15/02 (2006.01)
H02M 1/42 (2007.01)

(52) U.S. Cl.
CPC .......... *G05B 15/02* (2013.01); *H02M 1/4258* (2013.01); *Y02B 70/126* (2013.01)

(58) Field of Classification Search
None
See application file for complete search history.

(56) References Cited

U.S. PATENT DOCUMENTS

| | | | | | |
|---|---|---|---|---|---|
| 3,665,502 | A | * | 5/1972 | Means | H02K 47/04 307/47 |
| 2004/0133314 | A1 | * | 7/2004 | Ehlers | F24F 11/0012 700/276 |
| 2007/0235440 | A1 | * | 10/2007 | Gu | H05B 1/0244 219/482 |
| 2008/0049464 | A1 | * | 2/2008 | Chen | H02M 1/12 363/44 |
| 2011/0302430 | A1 | * | 12/2011 | Boss | G06F 1/26 713/310 |
| 2011/0309760 | A1 | * | 12/2011 | Beland | H02M 1/4258 315/201 |
| 2012/0206064 | A1 | * | 8/2012 | Archenhold | H05B 33/0812 315/297 |
| 2012/0243267 | A1 | * | 9/2012 | Kassayan | H02M 3/33569 363/21.12 |
| 2014/0112029 | A1 | * | 4/2014 | Lin | H02M 1/15 363/21.12 |
| 2014/0214227 | A1 | * | 7/2014 | Thornton | H02J 4/00 700/295 |
| 2014/0300274 | A1 | * | 10/2014 | Acatrinei | H05B 33/0815 315/85 |

FOREIGN PATENT DOCUMENTS

| | | | |
|---|---|---|---|
| JP | 07211562 | A * | 8/1995 |
| JP | 2009290950 | A * | 12/2009 |

OTHER PUBLICATIONS

Papanikolaou et al., "Design of a PFC AC/DC flyback Converter for low voltage applications", 2005, KYRITSIS Anastasios, pp. 1-10.*

* cited by examiner

*Primary Examiner* — Jason Lin
(74) *Attorney, Agent, or Firm* — RatnerPrestia (57) ABSTRACT The present environment controller is adapted for being powered in low-voltage daisy-chained power configuration. The environment controller comprises a low-voltage daisy-chainable power supply comprising a Power Factor Conversion (PFC) flyback converter. The low-voltage daisy-chainable power supply receives a low-voltage power and outputs a high PFC low-voltage power for powering the environment controller.

20 Claims, 8 Drawing Sheets

LOW VOLTAGE ENVIRONMENT CONTROLLER WITH POWER FACTOR CORRECTION FLYBACK POWER SUPPLY

TECHNICAL FIELD

The present disclosure relates to the field of environment controllers. More specifically, the present disclosure relates to a low voltage environment controller with a high Power Factor Correction (PFC) flyback power supply for use in daisy-chained power configurations.

BACKGROUND

Environment controllers are used in building automation and industrial environments to control one or a plurality of environment conditions. Environment controllers receive measurements performed by one or several sensors in an area of the building, and correspondingly instruct an equipment to perform an instruction so as to change the environment condition. One environment controller may control one or several equipment for an area of the building.

Typical implementations require the use of several environment controllers to control one of a plurality of environment conditions for an area of a building (such as for example a room, a subset of rooms, a floor, an aisle, etc.). There is therefor a need to use multiple environment controllers concurrently.

Each environment controller requires power to function. UL standards define various classes of power units, including class 2 power units for indoor and outdoor power supplies and battery chargers. Class 2 is particularly interesting, as it requires an isolating transformer, and limits the output voltages to 42.4 V peak for alternating current or 60V for continuous direct current with a transformer capacity of a maximum of 100VA Class 2 power supplies are safely used and installed without requiring the involvement of electricians. Other standards similarly define power supplies specifications and requirements.

Output voltages of up to 42.4V peak for alternating current are often referred as low-voltage. Low voltages are typically less dangerous than higher voltages. However, low-voltage power supplies typically suffer from a relatively low electrical power factor, i.e. the useful power output/total apparent power input.

Low electrical power factor may be acceptable for stand-alone power supplies. However, low electrical power factor seriously affects equipment connected in a daisy-chained power configuration, such as for example environment controllers.

There is therefore a need for a low-voltage daisy-chainable environment controller with improved electrical power factor.

SUMMARY

According to a first aspect, the present disclosure provides an environment controller for a use in a daisy-chained power configuration. The environment controller comprises a low-voltage daisy-chainable power supply comprising a Power Factor Correction (PFC) flyback converter. The low-voltage daisy-chainable power supply receives a low-voltage power and the PFC flyback converter has a high power factor for supplying a high power factor low-voltage power to the environment controller.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to environment controllers in daisy-chained power configuration.

Figure 1:
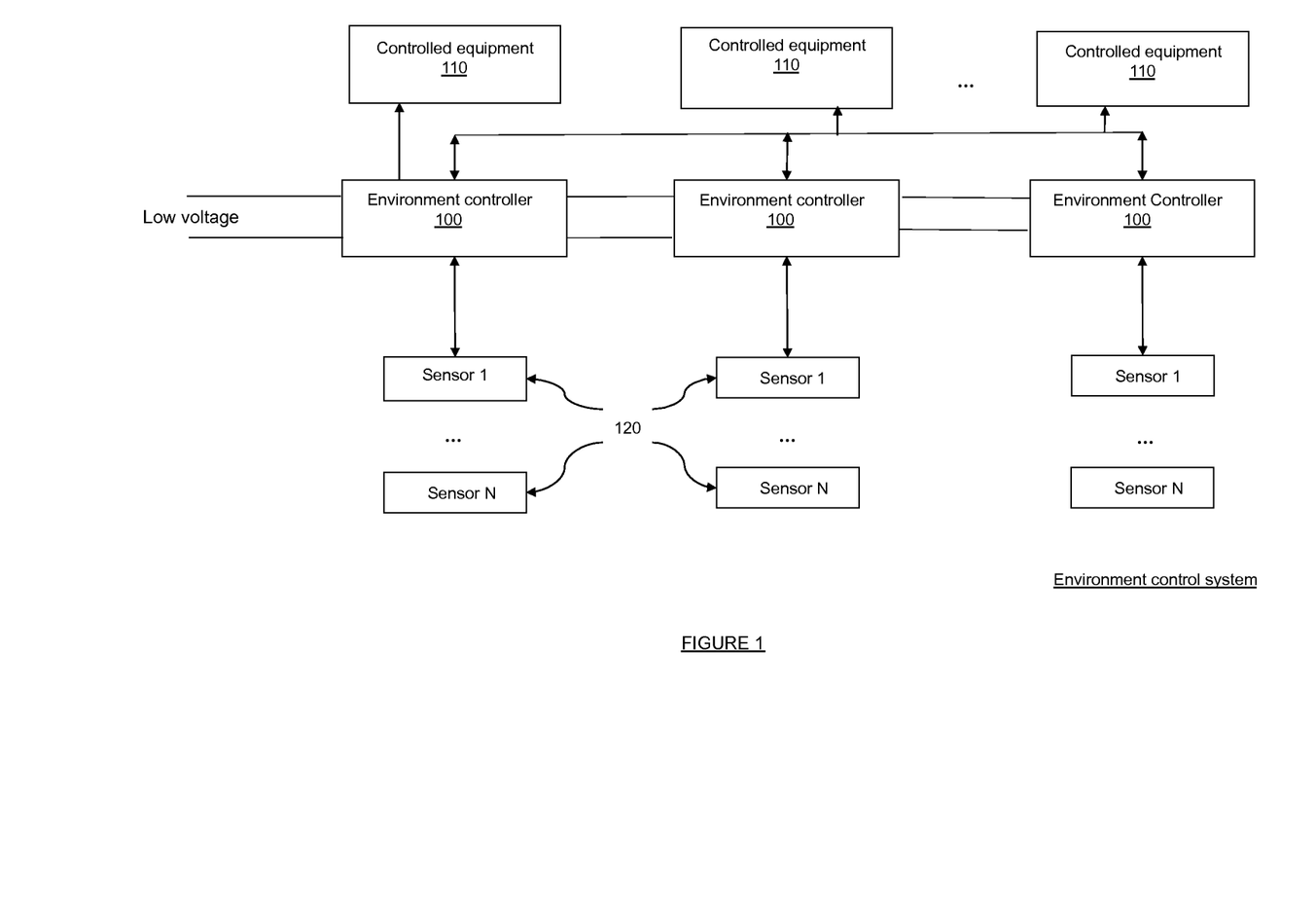
FIG. 1 represents a functional block diagram of an environment control system with a series of environment controllers in daisy-chained power configuration.

Referring to FIG. 1, there is provided a functional block diagram of an environment control system. The environment control system typically includes a plurality of environment controllers 100, each environment controller 100 being connected and/or in communication directly or indirectly with controlled equipment 110 and one or several sensors 120. The number of controller equipment 110 and sensors 120, and the configurations therewith are shown for exemplary purposes and are not intended to limit the range of possible components, which may be included in the environment control system.

The environment controllers 100 are connected in a daisy-chained power configuration, i.e. each environment controller 100 is connected one after another to a low-voltage power line. Daisy-chained power configuration is particularly interesting for facilitating the installation of a large number of environment controllers 100 as the environment controllers 100 do not require to each have their own power line and are connected directly on a single power line one after another, as shown on FIG. 1. The daisy-chained power configuration thus allows connecting a certain number of environment controllers 100 on one power line, instead of having each environment controller 100 independently connected to a separate power line.

As each environment controller 100 requires a certain amount of electrical energy to operate, the total amount of electrical power required in the daisy-chained power configuration gradually increases as more environment controllers 100 are connected to the low-voltage power line. Within the scope of the present specification, the expression low-voltage is meant to refer to electric voltages in the range of 24VAC (20-30 VAC RMS). The building environment automation industry is constantly pushing for more low-voltage equipment, as they are safer and easier to install, which reduces installation costs and security concerns.

Figure 2:
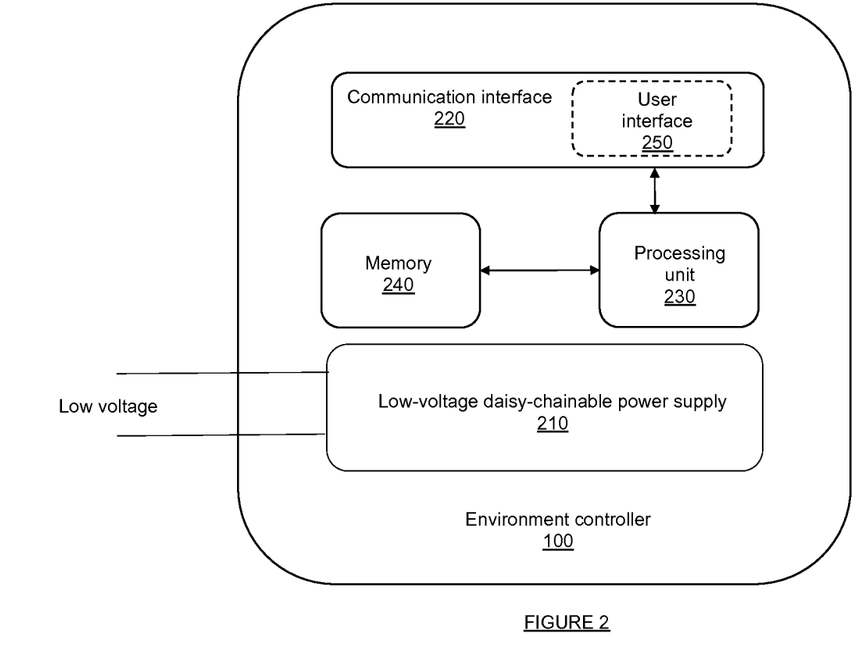
FIG. 2 represents a functional block diagram of an environment controller of FIG. 1.

Reference is now concurrently made to FIG. 2, which is a functional block diagram of the environment controller 100. The environment controller 100 comprises a low-voltage daisy-chainable power supply 210, a communication interface 220, a processing unit 230 and a memory 240. Optionally, the environment controller 100 may further include a user interface 250 (such as an actuator, a pressure sensor, universal inputs, universal outputs, peripheral sensors, a keyboard, a touch screen panel, a USB input, a Bluetooth connection, etc.) for allowing a technician in proximity of the environment controller 100 to input or change directly operating parameters of the environment controller 100.

The environment controller 100 operates at low-voltages, i.e. 24VAC (20-30 VAC RMS). To increase the number of low-voltage environment controllers 100 which can be connected in daisy-chained power configuration on a single low-voltage power line trunk, each environment controller 100 comprises a low-voltage daisy-chainable power supply 210.

Reference is now further made to FIGS. 3, 4A, 4B, 5A and 5B.

Flyback transformers (i.e. flyback without power factor correction) transform Alternative Current (AC) input voltage into Direct Current (DC) output voltage, with a typical Power Factor of 70%. PFC Flyback power supplies are a particular type of flyback power supplies including components for performing power factor correction, and thus reaching a PFC of up to 99%.

To comply with regulations, flyback rectifiers generally include an Electro-Magnetic Interference (EMI) filter, to avoid injecting electrical interferences in a power line providing the AC input voltage (e.g. in a power line of a power grid of an electricity provider for example). The EMI filter is realized by a combination of inductors and capacitors.

The present low-voltage daisy-chainable power supply 210 comprises an AC input voltage 312. The AC input voltage 312 alternates between positive and negative half cycles (represented in FIG. 5A). In the example illustrated, the AC input voltage 312 is a 24 volts (V) AC voltage. A 24 V AC voltage has a root mean square value of 24 V, and has a time-averaged delivered power equivalent to the power delivered by a DC voltage of 24 V. The 24 V AC is typically almost sinusoidal. The present low-voltage daisy-chainable power supply 210 operates in the range of 20-30 VAC RMS. The frequency of the AC input voltage 312 is typically 50 or 60 Hz.

The low-voltage daisy-chainable power supply 210 generates a DC output voltage 314. The DC output voltage 314 has a nominal value of 18.8 V. However, the low-voltage daisy-chainable power supply 210 may generate various DC voltage outputs in the range of +/−0.5 to 40 VDC. The current at the DC output 314 is rated for 0.0-0.8A leaving an output power available of maximum 15W.

Figure 4A:
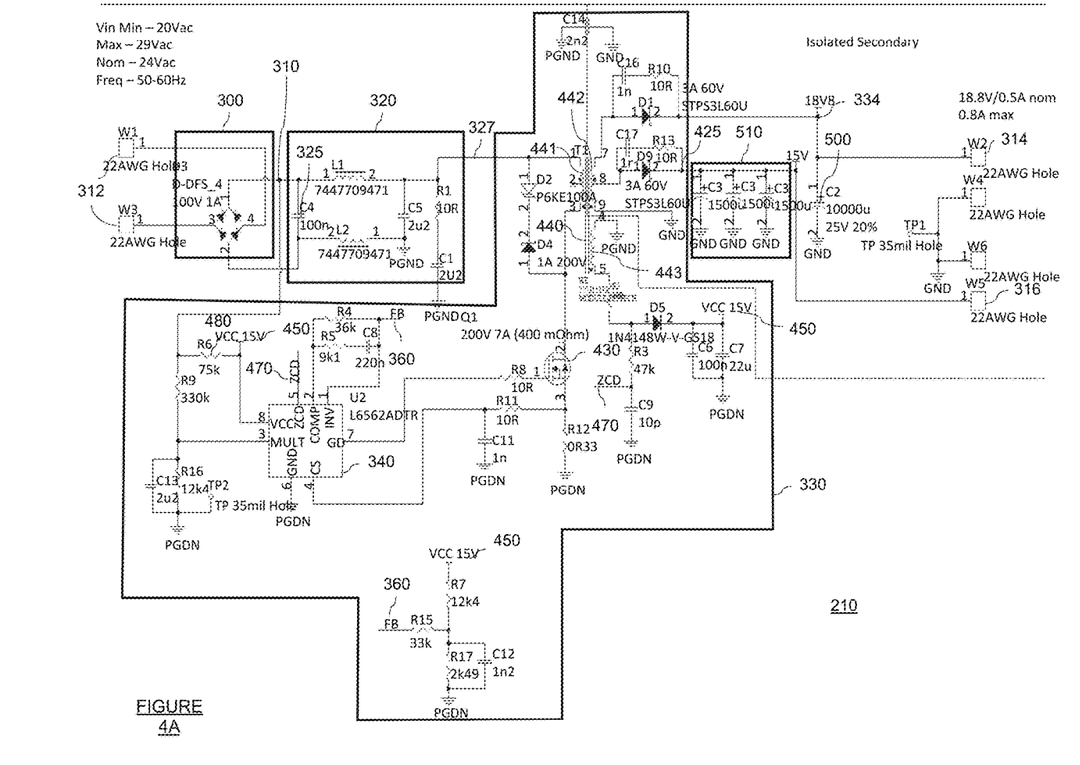
FIGS. 4A and 4B represent exemplary implementation of the low-voltage daisy-chainable power supply of FIG. 3.
Figure 5A:
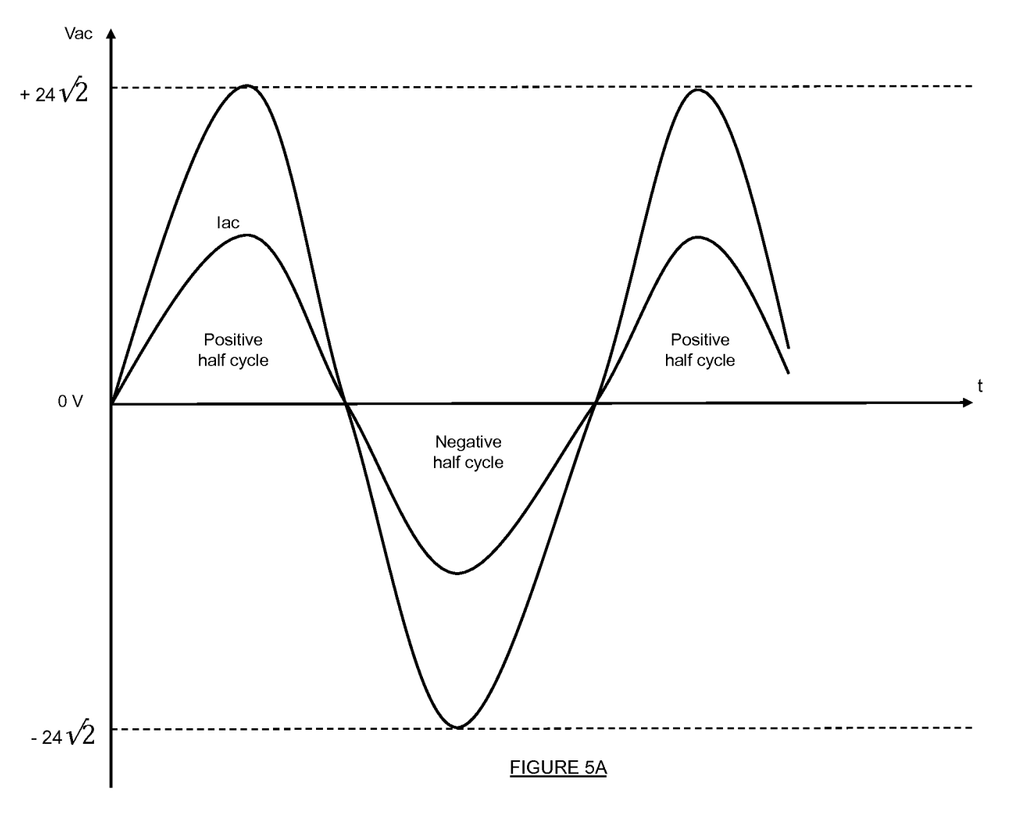
FIGS. 5A and 5B respectively illustrate exemplary non-rectified and rectified voltage signals.
Figure 5B:
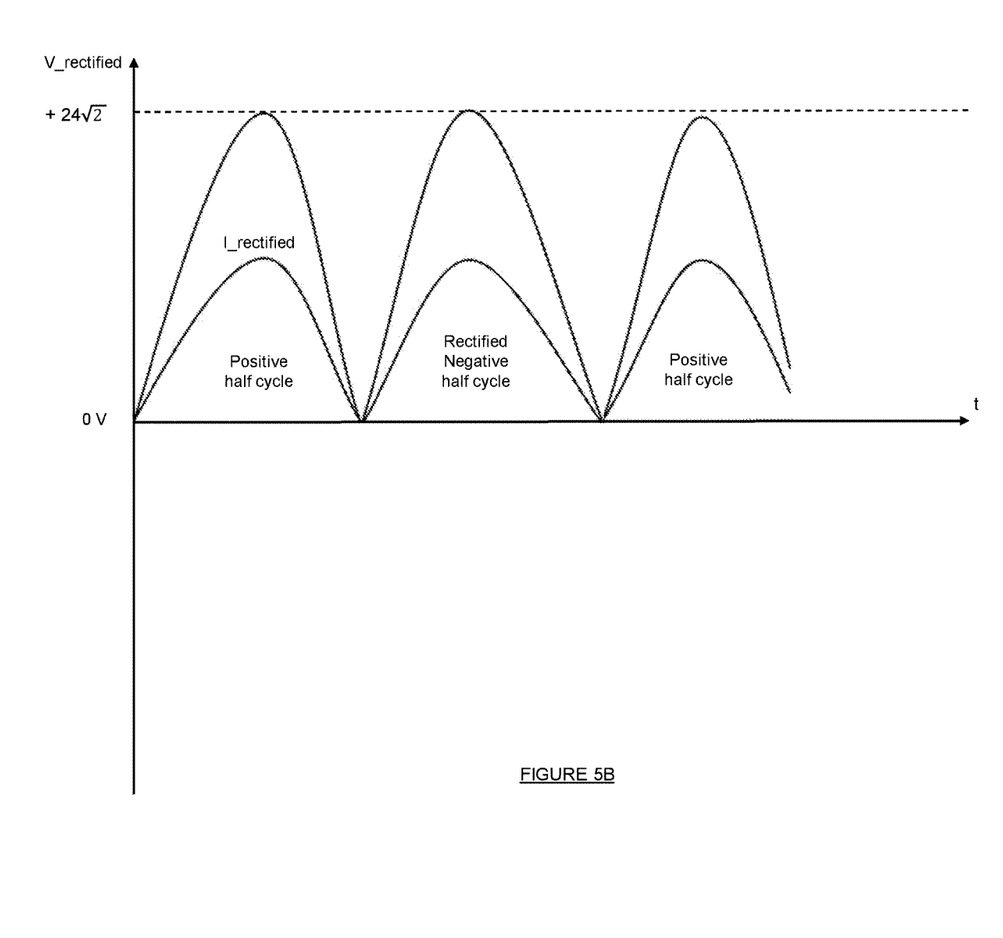

The low-voltage daisy-chainable power supply 210 comprises a diode bridge rectifier 300 for rectifying the AC input voltage 312 into a low-voltage rectified AC supply voltage. FIG. 4A illustrates an example of diode bridge rectifier 300 as known in the art. The diode bridge rectifier 300 may include four diodes, where two diodes conduct current during a positive half-cycle of the AC input voltage 312, and the other two diodes conduct current during a negative half-cycle of the AC input voltage 312. FIG. 5A represents the AC input voltage 312 (and corresponding input current) before rectification, and FIG. 5B represents the low-voltage rectified AC supply voltage (and corresponding rectified current) at an output 310 of the diode bridge rectifier 300. For the 24VAC transformer, the low-voltage daisy-chainable power supply acts as a resistor, so that the low-voltage rectified AC supply voltage ($V_{rectified}$) and the rectified current ($I_{rectified}$) at the input 310 are in phase ($V_{rectified}=R*I_{rectified}$ where R represents the resistor circuit equivalent after the diode bridge rectifier 300).

The low-voltage daisy-chainable power supply 210 also comprises an EMI filter 320 after the diode bridge rectifier 300. EMI filters are well known in the art. Most countries have legal requirements for preventing an electronic device, such as the present low-voltage daisy-chainable power supply 210, to inject electromagnetic interferences in the power grid (via the input 312). Thus, the present EMI filter 320 filters interferences generated by a high PFC flyback converter 330 (described later) connected to its output 327, which could otherwise be injected in the power grid through the input 312, and would not respect established security standards. The EMI filter 320 has a low overall capacitance in order to minimize its effect on the power factor and because the range of frequencies to filter is way above 60 Hz (150 kHz to 30 MHz). The EMI filter is provided by the combinations of passive components such as inductors, capacitors and resistors.

The combination of the diode bridge rectifier 300 and the low capacitance 325 of the EMI filter 320 is necessary in achieving high PF. With a half-bridge rectifier (not shown), the PF of the low-voltage daisy-chainable power supply 210 could only be in the order of 40%, since there would be no current available for the environment controller 100 on the negative half cycle of the AC input voltage 312. Furthermore, if the capacitance 325 were to be a high capacitance, the high capacitance would introduce a difference between the rectified voltage ($V_{rectified}$) and the rectified current ($I_{rectified}$) respectively at the output 310 of the EMI filter and at the transformer 440, hence the current consumption by the environment controller 100 would occur only on the voltage peaks, thus not allowing to reach a high Power factor. It is thus important to achieve high power factor that the flyback controller 340 maintains the voltage at the output 310 of the diode bridge rectifier 300 and the current at the transformer 440 in phase and similar as previously described.

In a particular aspect illustrated in FIG. 4A, the EMI filter 320 comprises an input capacitor 325 after the diode bridge rectifier 300. The input capacitor 325 represented in FIG. 4A has a capacitance of 0.1 micro Farad. However, the present low-voltage daisy-chainable power supply 210 may operate with the input capacitor 325 having a capacitance of higher value but thereby decreasing the achieved PF. The EMI filter 320 represented in FIG. 4A comprises two additional capacitors C5 (capacitance of 2 micro Farad) and C1 (capacitance of 2 micro Farad), two inductances L1 and L2, and a resistor R1. The EMI filter 320 represented in FIG. 4A is for illustration purposes only, and other implementations of EMI filters could be used in the present low-voltage daisy-chainable power supply 210.

The present low-voltage daisy-chainable power supply 210 further comprises a flyback converter 330 correcting the power factor (PF) (i.e. at least 90% power factor conversion). The flyback converter 330 has an input 332 for receiving a voltage from the output 327 of the EMI filter 320, an output 334 for supplying the DC output voltage 314, and a flyback controller 340 for controlling operations of the flyback converter 330.

Figure 4B:
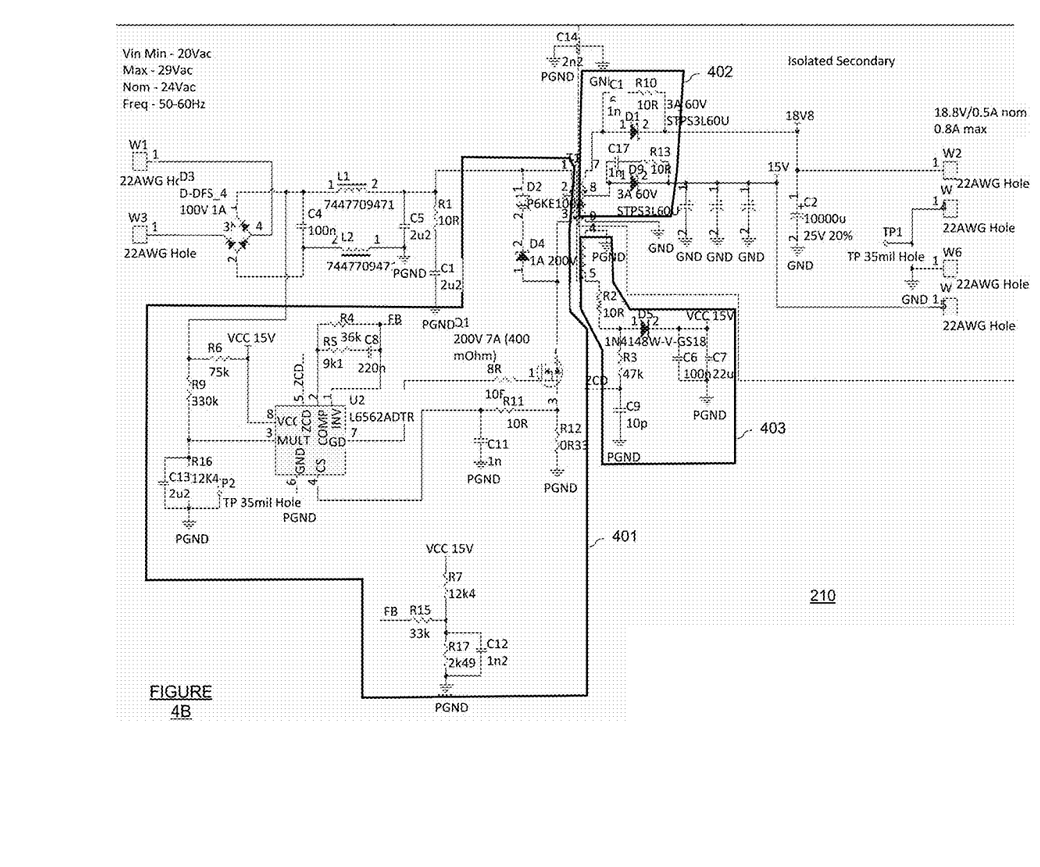

FIGS. 4A and 4B illustrate an exemplary implementation of the low-voltage daisy-chainable power supply 210, and more particularly the operation of the flyback converter 340. The flyback converter 330 is represented on FIG. 4B as comprising a primary side circuit 401, a secondary side circuit 402 (isolated from the primary side circuit 401) and a tertiary circuit 403 (also known as an auxiliary circuit).

The flyback converter 330 comprises a transformer 440 having a primary winding 441 (providing a primary inductance) in the primary side circuit 401, a secondary winding 442 (providing a secondary inductance) in the secondary side circuit 402, and a tertiary winding 443 (providing a tertiary inductance) in the tertiary circuit 403. Primary current is received by the flyback converter 330 from the output 327 of the EMI filter 320. A secondary current circulating in the secondary winding 442 is outputted by the output 334 of the flyback converter 330. A turn ratio between the primary winding 441 and the secondary winding 442 substantially determines a ratio between the DC output voltage 314 and the AC input voltage 312.

In operation, the flyback controller 340 detects the voltage at the output of the tertiary winding of the flyback converter 330 to ensure that the voltage at the output of the tertiary winding of the flyback converter 330 is at a certain level, i.e. 15V in the present example. In the event that the voltage at the output of the tertiary winding of the flyback converter 330 is not at the predetermined level, the flyback controller 340 regulates the primary current circulating in the primary winding 441, by switching a metal-oxide-semiconductor field-effect transistor (MOSFET) 430. More precisely, the flyback controller 340 regulates the primary current circulating in the primary winding 441 of the transformer 440 of the flyback converter 330 by changing the value at a gate terminal of the MOSFET 430, thereby turning ON or OFF the primary current in the primary winding 441 of the transformer 440. The regulation is done by assuming a turn ratio between the tertiary winding and the secondary winding. There are also implementations of this type of controller with an opto-coupler for a more precise output regulation.

Figure 3:
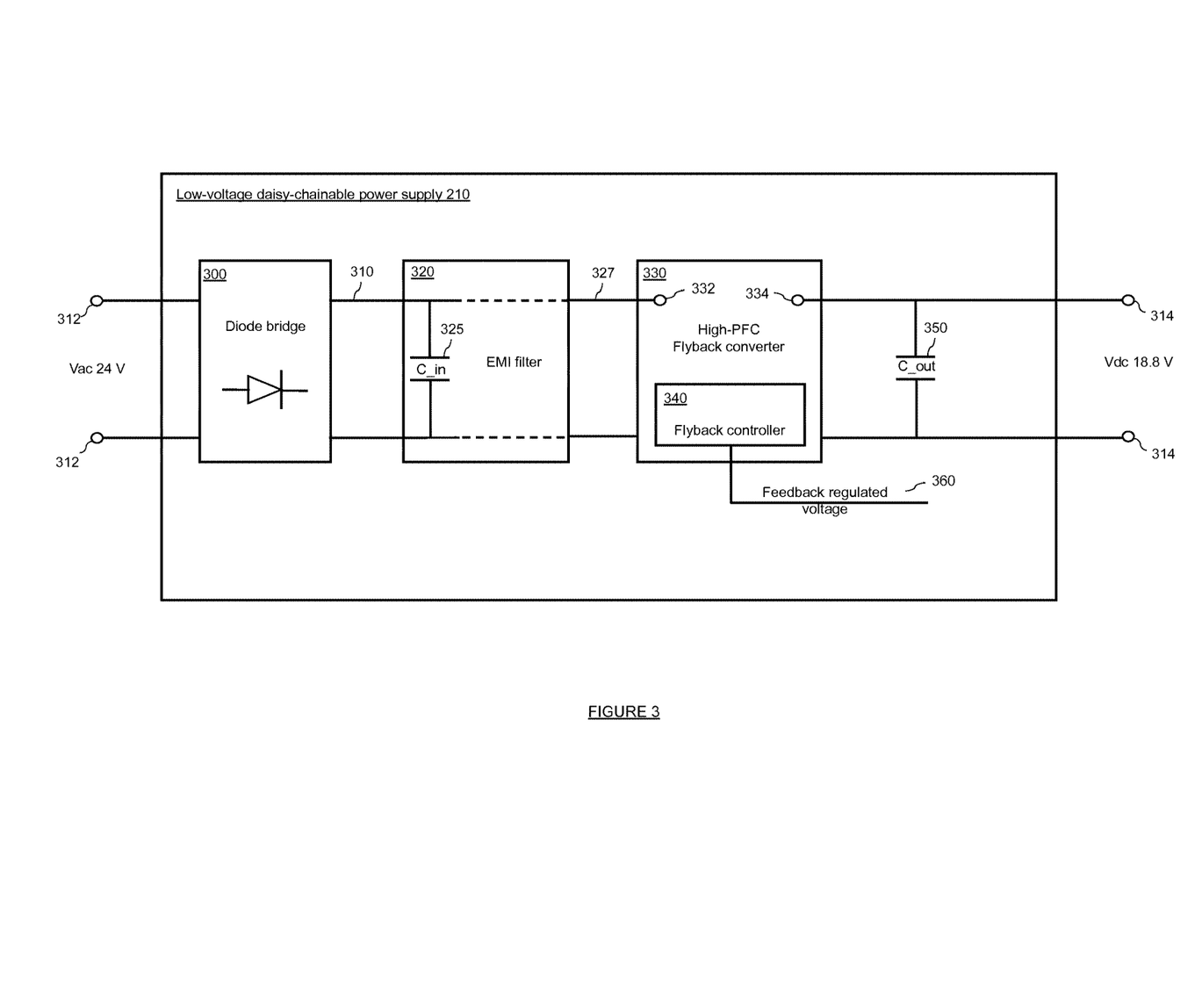
FIG. 3 represents a block diagram of a low-voltage daisy-chainable power supply.

Controlling the operations of the flyback converter 330 by the flyback controller 340 includes maintaining a high power factor (at least 90%) and maintaining a constant DC output voltage 314. For this purpose, the flyback controller 340 further receives the feedback regulated voltage 360, as illustrated in FIG. 3. In a typical implementation, the feedback regulated voltage 360 is directly taken on the secondary side circuit 402, via an optocoupler. In the implementation represented in FIGS. 4A and 4B, the tertiary circuit 403 (only represented in FIG. 4B for simplification purposes) is used in place of an optocoupler (to reduce costs) for providing the feedback regulated voltage 360 to the flyback controller 340.

The tertiary current circulating in the tertiary winding 443 generates the regulated voltage 450 (identified as VCC_15V in FIG. 4A). The regulated voltage 450 and the output DC voltage 314 are proportional, based on a turn ratio between the primary winding 441 and the tertiary winding 443, and a turn ratio between the primary winding 441 and the secondary winding 442. For example, the turn ratio between the primary winding 441 and the tertiary winding 443 is 2.43 (2.43 times more turns on the primary winding 441 than on the tertiary winding 443), while the turn ratio between the primary winding 441 and the secondary winding 442 is 2 (2 times more turns on the primary winding 441 than on the secondary winding 442). Thus, the turn ratio between the tertiary winding 443 and the secondary winding 442 is 2/2.43=0.823. Consequently, if the target output voltage 314 is 18.8 V, the regulated voltage 450 shall be 18.8*0.823=15.5 V. The flyback controller 340 controls the flyback converter 330 to regulate the regulated voltage 450 (e.g. at 15.5 V), and to generate the target output voltage 314 (e.g. 18.8 V).

The flyback controller 340 receives the regulated voltage feedback 450 from the tertiary circuit 403. Thus, if the regulated voltage 450 deviates from its target value (e.g. 15.5 V), the flyback controller 340 modifies the operations of the flyback converter 330 so that the regulated voltage 450 converges back to its target value (e.g. 15.5 V). The regulated voltage 450 is also used to power the flyback controller 340. However, when the flyback controller 340 is started, it is powered via resistor 480 to which is applied the regulated voltage 450, and only after startup it is mostly powered via the tertiary winding.

The flyback controller 340 receives another voltage (ZCD 470) from the tertiary circuit 403. The ZCD voltage 470 is used to control the PFC of the flyback converter 330 in a manner well known in the art, and referred to as Transition Mode (on the boundary between continuous and discontinuous inductor current mode).

The low-voltage daisy-chainable power supply 210 further comprises a storage capacitance 500 at the DC output (334 or 314) of the PFC flyback converter 330. As illustrated in FIG. 4A, the parallel storage capacitance 500 may consist in a single capacitor having a very high capacitance, for instance substantially 10000 micro Farad. Alternatively, the parallel storage capacitance 500 consists in a plurality of capacitors providing a very high capacitance in combination. The very high parallel storage capacitance 500 minimizes variations of the DC output voltage 314.

In a particular aspect illustrated in FIG. 4A, the low-voltage daisy-chainable power supply 210 further comprises a second DC output voltage 316. The flyback converter 330 has a second output 425 for supplying the second DC output voltage 316. A second parallel storage capacitance 510 is positioned between the second output 425 of the flyback converter 330 and the second DC output 316 of the low-voltage daisy-chainable power supply 210.

The second DC output voltage 316 has a nominal value of 15 V. However, the low-voltage daisy-chainable power supply 210 illustrated in FIG. 4A may operate with a second DC output voltage in the same range as the first DC output voltage 314.

The flyback controller 340 simultaneously controls the first 314 and second 316 DC output voltages, by regulating the voltage 450 in the tertiary circuit 443 via the received regulated voltage 450.

The second parallel storage capacitance 510 may consist in a single capacitor having a very high capacitance, for instance substantially 4500 micro Farad. Alternatively, as illustrated in FIG. 4A, the second parallel storage capacitance 510 consists in a plurality of capacitors (e.g. C3, C10 and C15 each at 1500 micro Farad) providing a very high capacitance (e.g. 4500 micro Farad) in combination.

Figure 6:
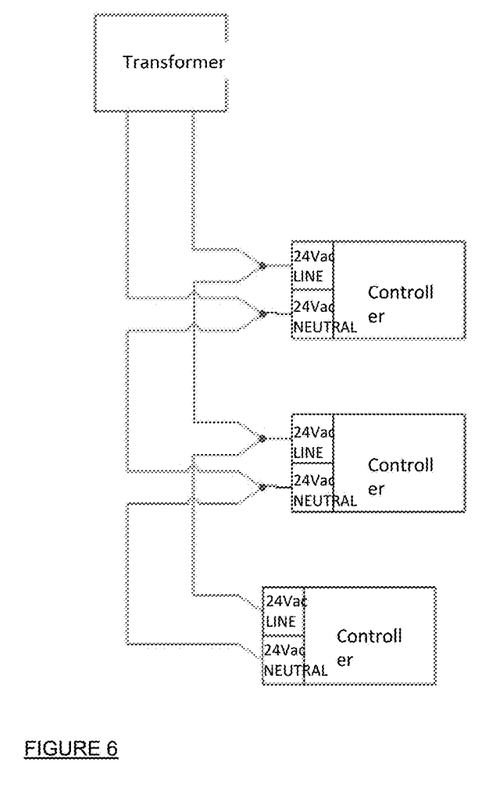
FIG. 6 is two schematic representations of three environment controllers connected in daisy-chained configuration.

Referring now to FIG. 6, there is represented two schematic examples of three environment controllers connected in daisy-chained configuration. The left-hand side schematic represents the daisy-chained configuration performed by joining the power wires at the controller, while the right-hand side schematic represents the use of marettes to perform the daisy-chained power configuration.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller for use in daisy-chained power configuration, the environment controller comprising:
   a low-voltage daisy-chainable power supply comprising:

an AC input for receiving a low-voltage Alternating Current (AC) input voltage;

a diode bridge rectifier for rectifying the low-voltage AC input voltage into a low-voltage rectified AC supply voltage;

a single stage Power Factor Correction (PFC) flyback converter having a high power factor for converting the low-voltage rectified AC supply voltage into a high power factor low-voltage Direct Current (DC) output voltage, the high power factor low-voltage DC output voltage being supplied to the environment controller, the single stage PFC flyback converter comprising:

a primary side circuit connected to an input of the single stage PFC flyback converter, the input receiving the low-voltage rectified AC supply voltage, a secondary side circuit connected to an output of the single stage PFC flyback converter, the output outputting the high power factor low-voltage DC output voltage, the secondary side circuit being isolated from the primary side circuit, and an auxiliary circuit comprising a flyback controller for controlling the operations of the single stage PFC flyback converter by generating at least one feedback voltage proportional to the high power factor low-voltage DC output voltage; and a capacitance Electro-Magnetic Interference (EMI) filter positioned between the diode bridge rectifier and the single stage PFC flyback converter.

2. The environment controller of claim 1, wherein the single stage PFC flyback converter has a power factor of at least 90%.

3. The environment controller of claim 1, wherein the low-voltage daisy-chainable power supply further comprises:

a DC output for supplying the high power factor low-voltage DC output voltage generated by the single stage PFC flyback converter to the environment controller; and a parallel storage capacitance at the DC output;

and wherein the single stage PFC flyback converter achieves a low-voltage power factor of at least 90%.

4. The environment controller of claim 3, wherein the high power factor low-voltage DC output voltage is between 0.5 and 40V.

5. The environment controller of claim 3, wherein the single stage PFC flyback converter further comprises a second output for supplying a second DC output voltage to a second DC output of the low-voltage daisy-chainable power supply, and a second parallel storage capacitance positioned between the second output of the single stage PFC flyback converter and the second DC output of the low-voltage daisy-chainable power supply, the second DC output of the low-voltage daisy-chainable power supply supplying the second DC output voltage to the environment controller.

6. The environment controller of claim 1, wherein the low-voltage AC input voltage is in the range of 20-30 VAC root mean square (RMS).

7. The environment controller of claim 6, wherein the low-voltage AC input voltage is 24 VAC RMS.

8. The environment controller of claim 1, wherein the primary side circuit comprises a transformer with a primary winding connected to the input of the single stage PFC flyback converter, the secondary side circuit comprises a secondary winding connected to the output of the single stage PFC flyback converter, and the auxiliary circuit comprises a tertiary winding for generating the at least one feedback voltage used by the flyback controller for controlling the operations of the single stage PFC flyback converter.

9. The environment controller of claim 1, further comprising a processing unit, a memory, and a communication interface.

10. The environment controller of claim 9, further comprising a user interface.

11. The environment controller of claim 10, wherein the user interface comprises at least one of the following: an actuator, a pressure sensor, universal inputs, universal outputs, peripheral sensors, a keyboard, a touch screen panel, a Universal Serial Bus (USB) input, and a Bluetooth connection.

12. The environment controller of claim 9, wherein the environment controller is in communication with at least one controlled equipment and at least one sensor.

13. The environment controller of claim 1, wherein the EMI filter comprises an input capacitor having a capacitance greater or equal to 0.1 micro Farad.

14. The environment controller of claim 1, wherein the diode bridge rectifier comprises four diodes, two among the four diodes conducting current during a positive half-cycle of the low-voltage AC input voltage, and the other two among the four diodes conducting current during a negative half-cycle of the low-voltage AC input voltage.

15. An environment control system comprising a plurality of environment controllers in a daisy-chained power configuration, each environment controller being connected one after another to a low-voltage power line, each environment controller comprising:

a low-voltage daisy-chainable power supply comprising:

an AC input for receiving a low-voltage Alternating Current (AC) input voltage;

a diode bridge rectifier for rectifying the low-voltage AC input voltage into a low-voltage rectified AC supply voltage;

a single stage Power Factor Correction (PFC) flyback converter having a high power factor for converting the low-voltage rectified AC supply voltage into a high power factor low-voltage Direct Current (DC) output voltage, the high power factor low-voltage DC output voltage being supplied to the environment controller, the single stage PFC flyback converter comprising:

a primary side circuit connected to an input of the single stage PFC flyback converter, the input receiving the low-voltage rectified AC supply voltage, a secondary side circuit connected to an output of the single stage PFC flyback converter, the output outputting the high power factor low-voltage DC output voltage, the secondary side circuit being isolated from the primary side circuit, and an auxiliary circuit comprising a flyback controller for controlling the operations of the single stage PFC flyback converter by generating at least one feedback voltage proportional to the high power factor low-voltage DC output voltage; and a capacitance Electro-Magnetic Interference (EMI) filter positioned between the diode bridge rectifier and the single stage PFC flyback converter.

16. The environment control system of claim 15, wherein the single stage PFC flyback converter of each environment controller has a power factor of at least 90%.

17. The environment control system of claim 15, wherein the low-voltage daisy-chainable power supply of each environment controller further comprises:
- a DC output for supplying the high power factor low-voltage DC output voltage generated by the single stage PFC flyback converter to the environment controller; and
- a parallel storage capacitance at the DC output;
- and wherein the single stage PFC flyback converter achieves a low-voltage power factor of at least 90%.

18. The environment control system of claim 15, wherein the low-voltage AC input voltage is in the range of 20-30 VAC root mean square (RMS).

19. The environment control system of claim 15, wherein the EMI filter comprises an input capacitor having a capacitance greater or equal to 0.1 micro Farad.

20. The environment control system of claim 15, wherein the diode bridge rectifier comprises four diodes, two among the four diodes conducting current during a positive half-cycle of the low-voltage AC input voltage, and the other two among the four diodes conducting current during a negative half-cycle of the low-voltage AC input voltage.

* * * * *